US00RE47013E

(19) United States
(12) Reissued Patent
Rhie et al.

(10) Patent Number: US RE47,013 E
(45) Date of Reissued Patent: Aug. 28, 2018

(54) METHOD FOR MEASURING LOCATION OF RADIO FREQUENCY IDENTIFICATION READER BY USING BEACON

(71) Applicants: SK TELECOM CO., LTD., Seoul (KR); SK PLANET CO., LTD., Seongnam-si, Gyeonggi-do (KR)

(72) Inventors: Sangwoo Rhie, Seoul (KR); Sangmok Sohn, Seongnam-si (KR); Soonjae Jeong, Seongnam-si (KR); Jaesic Jeon, Seoul (KR); Youngshin Yoon, Seoul (KR); Youngil Kim, Anyang-si (KR); Sunshin An, Seoul (KR); Sungjun Kim, Seoul (KR); Youngmin Ji, Seoul (KR); Joosik Lee, Seoul (KR)

(73) Assignees: SK TELECOM CO., LTD., Seoul (KR); SK PLANET CO., LTD., Seongnam-si, Gyeonggi-do (KR)

(21) Appl. No.: 14/993,275

(22) Filed: Jan. 12, 2016

Related U.S. Patent Documents

Reissue of:
(64) Patent No.: 8,629,773
Issued: Jan. 14, 2014
Appl. No.: 12/624,096
Filed: Nov. 23, 2009

U.S. Applications:
(63) Continuation of application No. PCT/KR2008/002906, filed on May 23, 2008.

(30) Foreign Application Priority Data

May 23, 2007 (KR) ..... 10-2007-0050316

(51) Int. Cl.
*G08B 13/14* (2006.01)
*G01S 5/02* (2010.01)
(Continued)

(52) U.S. Cl.
CPC ..... *G01S 5/0294* (2013.01); *G01S 1/68* (2013.01); *G01S 5/0226* (2013.01); *G01S 5/14* (2013.01); *G01S 11/06* (2013.01)

(58) Field of Classification Search
CPC ..... G01S 5/0294; G01S 1/68; G01S 5/0226; G01S 11/06; G01S 5/14
(Continued)

(56) References Cited

U.S. PATENT DOCUMENTS 4,063,410 A * 12/1977 Welling ..... A61B 5/0002 128/903
4,074,227 A * 2/1978 Kalmus ..... B60C 23/0493 340/447
(Continued)

OTHER PUBLICATIONS

International Search Report dated Sep. 9, 2008 for PCT/KR2008/002906.

*Primary Examiner* — Kenneth J Whittington
(74) *Attorney, Agent, or Firm* — Hauptman Ham, LLP

(57) ABSTRACT

The present invention relates to a method for measuring a location of a radio frequency identification (RFID) reader by using beacons, and an RFID system for measuring a location of a moving RFID reader in an RFID system comprising: a plurality of beacon devices for emitting beacons; an RFID tag for transmitting pre-stored information by using radio frequency identification; and an RFID reader for calculating a current location using a plurality of at least three beacons wherein the RFID reader receives the plurality of beacons from the plurality of beacon devices while moving, and receiving the information from the RFID tag by using the radio frequency identification. According to the present invention, it is possible to increase the accuracy of the location measurement of a moving RFID reader in an RFID system because the location of the RFID reader is measured in consideration of propagation environments.

14 Claims, 5 Drawing Sheets

(51) Int. Cl.
*G01S 11/06* (2006.01)
*G01S 5/14* (2006.01)
*G01S 1/68* (2006.01)

(58) Field of Classification Search
USPC ..... 324/207.2, 207.23, 207.24; 342/450, 342/458, 461; 455/456.1, 456.3, 456.6; 340/572, 572.1, 572.4, 539.1, 539.13
See application file for complete search history.

(56) References Cited

U.S. PATENT DOCUMENTS 6,707,424 B1 3/2004 Snyder et al.
7,245,211 B2 * 7/2007 Ota ..... H01L 23/544 340/505
7,659,823 B1 * 2/2010 Killian ..... G06K 19/0717 340/572.1
7,755,487 B2 * 7/2010 O'Hagan ..... H01Q 1/2216 235/375
2002/0113707 A1 * 8/2002 Grunes ..... G06F 17/30879 340/572.1
2005/0014511 A1 * 1/2005 Spain ..... H04W 64/00 455/456.1
2005/0270156 A1 * 12/2005 Ravet ..... A63B 24/0021 340/572.1
2006/0071790 A1 4/2006 Duron et al.
2006/0071854 A1 * 4/2006 Wilcox ..... G01S 5/021 342/458
2007/0018820 A1 * 1/2007 Chand ..... G01C 21/206 340/572.1
2007/0126635 A1 * 6/2007 Houri ..... 342/451
2007/0254676 A1 * 11/2007 Pedigo et al. ..... 455/456.6
2008/0153507 A1 * 6/2008 Taaghol ..... H04W 64/00 455/456.1
2010/0052991 A1 * 3/2010 Smith et al. ..... 342/451
2010/0134288 A1 * 6/2010 Huang et al. ..... 340/572.1
2010/0201573 A1 * 8/2010 Lamming ..... 342/451

* cited by examiner

4a

4b

METHOD FOR MEASURING LOCATION OF RADIO FREQUENCY IDENTIFICATION READER BY USING BEACON

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is a broadening reissue of U.S. Pat. No. 8,629,773, issued on Jan. 14, 2014, which is a continuation of International Patent Application No. PCT/KR2008/002906, filed May 23, 2008, which is based upon and claims the benefit of priority to Korean Patent Application No. 10-2007-0050316, filed on May 23, 2007.*

TECHNICAL FIELD

The present invention relates to a method for measuring a location of a radio frequency identification (RFID) reader by using beacons, and an RFID system for the method. More particularly, the present invention refers to a location measurement method for easily and accurately measuring a location of a moving radio frequency identification (RFID) reader in an RFID system, and the same RFID system, in such a manner that the RFID system includes a plurality of beacon devices, which are fixed at predetermined locations and emit beacons including reference location information about their own locations and, signal-intensity-to-distance information, and that the RFID reader receives beacons from at least three beacon devices, identifies relative distances from the respective beacon devices by using signal-intensity-to-distance information included in the beacons, and calculates its own location through a triangulation method.

BACKGROUND ART

Location-based technology is a technology of acquiring information about the physical, geographical, and logical locations of an object (a person or thing) placed at a specific location, and appropriately reacting according to the acquired information. The conventional positioning methods include a triangulation method of determining a location by measuring a difference of distances between objects, an angle between them, or an azimuth angle between them, a scene analysis method using a scene viewed from a specific vantage point, and a proximity method of finding an object by approaching a specific location.

Recently, with the development of wireless communication technologies, a radio frequency identification (RFID) system has been highlighted as new wireless network technology, and has been widely used. It has been required to develop a technology of measuring a location indoors or outdoors by using the RFID system, and such a technology can be utilized for various purposes, such as collecting data by means of RFID in an inaccessible area, transmitting the collected data to users, etc.

Meanwhile, conventionally, there are various location measurement technologies, including a location measurement technology using a global positioning system (GPS), a location measurement technology using a received signal strength indication (RSSI) of a radio frequency signal, a location measurement technology using local-area wireless communication, etc.

The location measurement technology using a GPS is a technology of measuring a distance to a GPS satellite, which orbits the earth, by measuring the phase of a carrier signal sent from the GPG satellite (i.e. by absolute positioning) or by tracking the code of the carrier signal (i.e. by relative positioning). Since the location measurement technology using a GPS has wide signal coverage, and can stably provide service through a fixed satellite, it is currently the most widely used. However, the location measurement technology using a GPS has disadvantages in that precision is low, and that service is unavailable in shadow areas or indoors where GPS satellite signals cannot be received.

The location measurement technology using mobile communication is a technology of obtaining information about the geographical location of a mobile terminal through the triangulation method using a mobile communication system which has been constructed. The location measurement technology using mobile communication includes a network-based scheme of finding the location of a terminal through cooperation between a base station of a serving cell of the terminal and a neighboring base station, a terminal-based scheme in which a terminal having a GPS receiver, separately from a base station, transmits location information to a network, and a mixed scheme in which the two schemes are combined. These technologies do not require a separate infrastructure, and have wide service coverage, similar to the GPS, thereby being widely utilized as a macro-positioning technology. However, the technologies have a disadvantage in that the technologies can be used only within a cell radius around a base station and in metropolitan areas where radio waves can be received, and accuracy is degraded indoors due to diffraction by propagation characteristics, multiple paths, and signal attenuation.

The location awareness technologies using the satellite communication or mobile communication are suitable for an outdoor environment because of wide service coverage, but the location awareness technologies are restricted in shadow areas or indoors. Therefore, recently, research is being actively conducted into positioning methods using various wireless communication technologies, such as diffuse-infrared, ultrasonic wave, radio frequency (RF), ultra wideband (UWB), and radio frequency identification.

DISCLOSURE

Technical Solution

Most of these technologies calculate locations by using a difference between transmission speeds of ultrasonic waves, or by measuring a signal transmission distance according to signal attenuation obtained through measurements of the signal strength (i.e. RSSI) of an RF signal. In the case of using the RSSI, since the characteristics of the RF signals vary depending on the environments, there are defects in that it is difficult to accurately measure a location, and that an error rate is high. In the case of using the ultrasonic waves, there are defects in that the ultrasonic waves are sensitive to directions due to the characteristics of sound waves, and that equipment is heavy.

Therefore, the present invention has been made in view of the above-mentioned problems, and it is an object of the present invention to provide a location measurement method for easily and accurately measuring a location of a moving radio frequency identification (RFID) reader in an RFID system, and the same RFID system, in such a manner that the RFID system includes a plurality of beacon devices, which are fixed at predetermined locations and emit beacons including reference location information about their own reference locations and signal-intensity-to-distance information, and that the RFID reader receives beacons from at least three beacon devices, identifies relative distances from the respective beacon devices by using signal-intensity-to-distance information included in the beacons, and calculates its own location through a triangulation method.

In order to achieve the above-mentioned object, there is provided a radio frequency identification (RFID) system for measuring a location of an RFID reader by using a beacon, the system including: a plurality of beacon devices for emitting beacons; an RFID tag for transmitting pre-stored information by using radio frequency identification; and an RFID reader for calculating a current location by using a plurality of beacons when the RFID reader 120 receives the plurality of beacons from the plurality of beacon devices while moving, and receiving the information from the RFID tag by using the radio frequency identification.

According to another aspect of the present invention, there is provided a method for calculating a current location by a radio frequency identification (RFID) reader in an RFID system, which includes an RFID tag, the RFID reader, and a plurality of beacon devices, the method including the steps of: (a) receiving a plurality of beacons from the plurality of beacon devices; (b) calculating relative distances from the plurality of beacon devices by analyzing the plurality of beacons; and (c) identifying reference locations of the plurality of beacon devices by analyzing the plurality of beacons, and calculating the location by using the reference locations of the plurality of beacon devices and the relative distances from the plurality of beacon devices.

MODE FOR INVENTION

Figure 1:
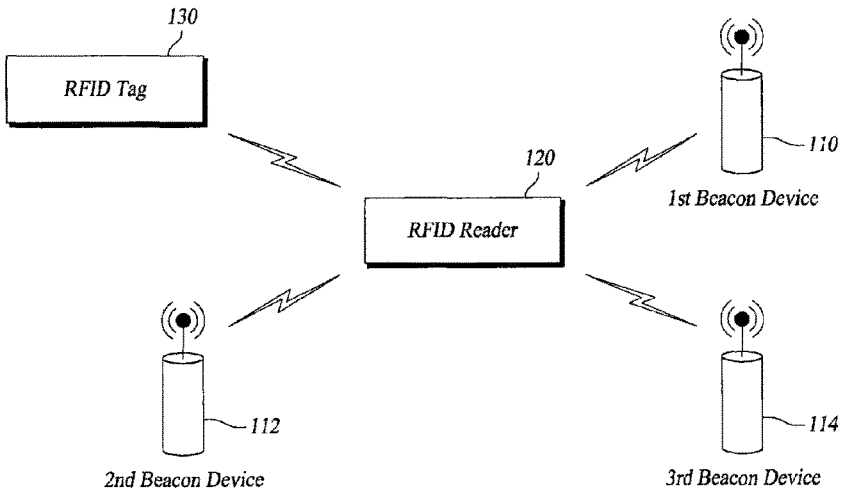
FIG. 1 is a block diagram schematically illustrating the configuration of a radio frequency identification (RFID) system for measuring the location of an RFID reader by using beacons according to an exemplary embodiment of the present invention.

Hereinafter, preferred embodiments of the present invention will be described with reference to the accompanying drawings. First, it is to be noted that the same elements are indicated with the same reference numerals throughout the drawings. In the following description, a detailed description of known functions and configurations incorporated herein will be omitted when it may make the subject matter of the present invention rather unclear.

FIG. 1 is a block diagram schematically illustrating the configuration of a radio frequency identification (RFID) system for measuring the location of an RFID reader by using beacons according to an exemplary embodiment of the present invention.

According to an exemplary embodiment of the present invention, the RFID system for measuring the location of an RFID reader by using beacons includes a first beacon device 110, a second beacon device 112, a third beacon device 114, an RFID reader 120, and an RFID tag 130.

The first to third beacon devices 110, 112, and 114 according to an exemplary embodiment of the present invention are fixedly installed at predetermined locations in the RFID system and emit their respective beacons so that the RFID reader 120 can measure its own current location. In this case, the beacon may be emitted as various wireless signals, such as an RF signal, a Zigbee signal, a Bluetooth signal, etc.

Also, each of the first to third beacon devices 110, 112, and 114 according to an exemplary embodiment of the present invention emits a beacon, including reference location information about a reference location where the beacon device is positioned, and signal-intensity-to-distance information, in which the circumstances of an area where the beacon device is positioned are reflected.

To this end, each of the first to third beacon devices 110, 112, and 114 according to an exemplary embodiment of the present invention includes a beacon emission means for emitting a beacon, a memory for storing reference location information and signal-intensity-to-distance information, and storing software which controls the pieces of information to be included in a beacon and to be emitted and which controls the entire operation of the corresponding beacon device, and a microprocessor for executing the software stored in the memory. *The first to third beacon devices 110, 112, and 114 may also be referred to as beacon transmitters.*

Here, the reference location information represents three-dimensional coordinates (x axis, y axis, z axis) of a location where each beacon device is positioned. The signal-intensity-to-distance information represents information about relative distances (i.e. straight distances regardless of direction) from the reference location of each beacon device to the RFID reader 120 according to signal intensities of beacons received by the RFID reader 120 from the beacon device, where the propagation environment of an area where the beacon device is positioned is reflected in the information. The reference location information and the signal-intensity-to-distance information will be described later in detail with reference to FIG. 3.

Meanwhile, although FIG. 1 shows the case where the RFID system for measuring the location of a RFID reader using beacons according to an exemplary embodiment of the present invention includes only three beacon devices 110, 112, and 114, four, five, or more beacon devices may be distributed in the RFID system.

The RFID reader 120 according to an exemplary embodiment of the present invention communicates with the RFID tag 130, and acquires information stored in the RFID tag 130 through the communication.

Also, receiving beacons from the first to third beacon devices 110, 112, and 114, the RFID reader 120 according to an exemplary embodiment of the present invention analyzes beacons received from each beacon device 110, 112, and 114, identifies the reference location information of each beacon device 110, 112, and 114, and the signal-intensity-to-distance information of each beacon device 110, 112, and 114, and calculates its own current location by using the reference location information and the signal-intensity-to-distance information.

In this case, the RFID reader 120 measures the signal intensity of each beacon received from each beacon device 110, 112, and 114, calculates relative distances from the beacon devices 110, 112, and 114 by associating the measured signal intensity of each beacon with the signal-intensity-to-distance information of each corresponding beacon device 110, 112, and 114, and calculates the current location through the triangulation method using the relative distance from each beacon device 110, 112, and 114 and the reference location information of each beacon device 110, 112, and 114. A procedure where the RFID reader 120 calculates the current location through the triangulation method will be described later in detail with reference to FIGS. 4A and 4B.

Also, the RFID reader 120 according to an exemplary embodiment of the present invention receives beacons from at least three beacon devices among a plurality of beacon devices in order to calculate the current location. That is, as described above, the RFID system for measuring the location of an RFID reader using beacons according to an exemplary embodiment of the present invention may include three or more beacon devices. The RFID reader 120 must receive beacons from at least three beacon devices in order to calculate the current location. Therefore, when receiving beacons from four or more beacon devices, the RFID reader 120 uses beacons received from three beacon devices, from which relatively higher signal intensities of beacons have been received, in order to calculate the current location.

Also, the RFID reader 120 according to an exemplary embodiment of the present invention measures the locations thereof while moving, and calculates a moving speed and a moving direction. That is, when the RFID reader 120 has moved after measuring a current location (pre-moving location), the RFID reader 120 measures a current location (post-moving location) at a location after the movement, measures a movement time from the pre-moving location to the post-moving location, measures a moving distance from the pre-moving location to the post-moving location, and calculates a ratio of the moving distance to the movement time as a velocity. In addition, the RFID reader 120 calculates a vector from the pre-moving location to the post-moving location, thereby calculating a moving direction. A method of calculating a moving speed and a moving direction by the RFID reader 120 will be described later in detail with reference to FIG. 5.

Figure 2:
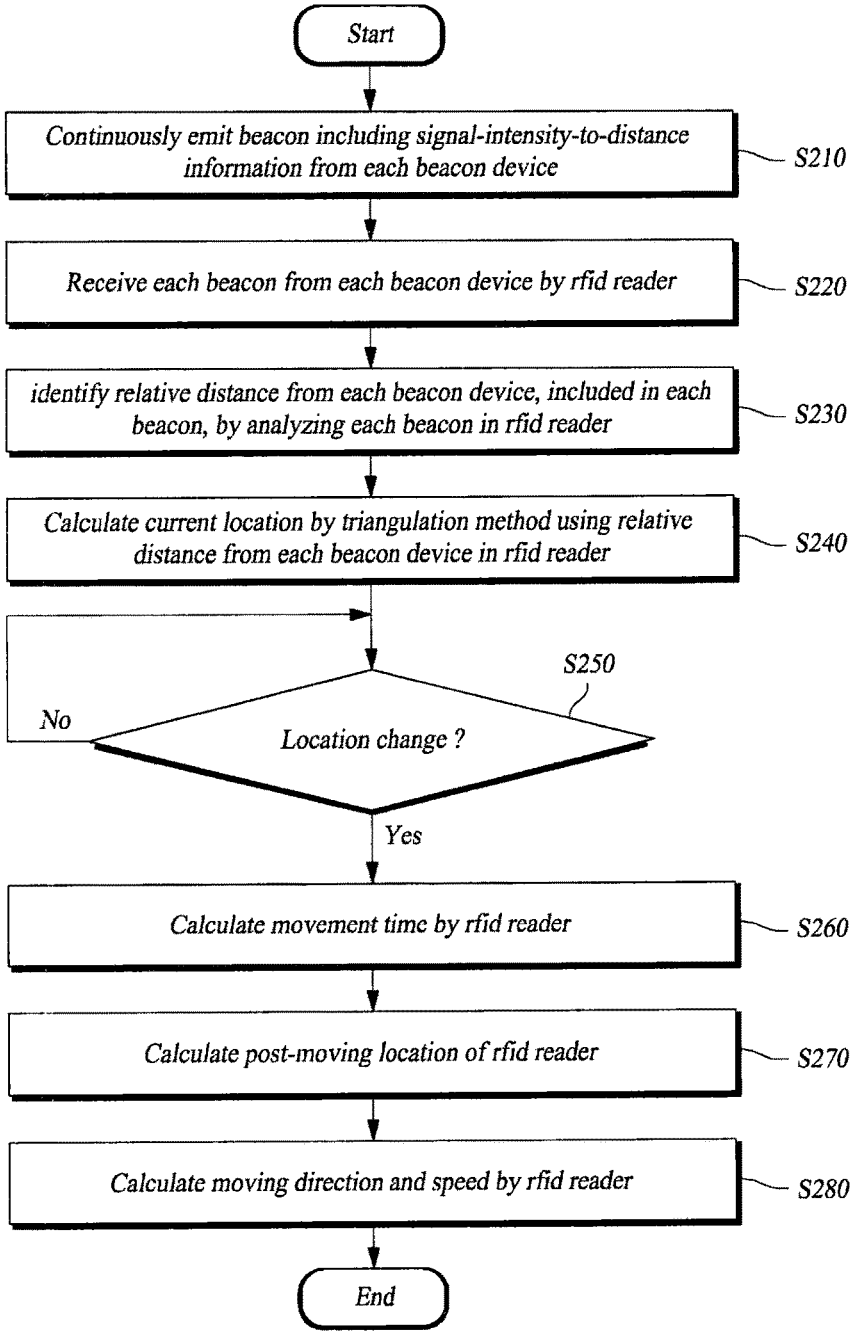
FIG. 2 is a flowchart illustrating a method for measuring the location of an RFID reader by using beacons according to an exemplary embodiment of the present invention.

FIG. 2 is a flowchart illustrating a method for measuring the location of an RFID reader by using beacons according to an exemplary embodiment of the present invention.

Each of the first to third beacon devices 110, 112, and 114, which are separately and fixedly installed in the RFID system, continuously emits a beacon, including its own reference location information and the signal-intensity-to-distance information according to the propagation environments thereof (step 210).

The RFID reader 120, which is moving within the RFID system, receives the beacons emitted from the first to third beacon devices 110, 112, and 114 (step 220), and identifies relative distances from the beacon devices 110, 112, and 114 by analyzing the beacons received from the beacon devices 110, 112, and 114 (step 230).

The RFID reader 120 calculates the current location through the triangulation method using the relative distances from the beacon devices 110, 112, and 114 and the reference location information of each beacon device 110, 112, and 114 (step 240).

Meanwhile, when the RFID reader 120 has moved after calculating the current location, the RFID reader 120 can measure a current location even at the post-moving location according to the procedure of steps 210 to 240.

Therefore, when the RFID reader 120 has moved (step 250), the RFID reader 120 measures a movement time from the pre-moving location to the post-moving location (step 260), and measures the post-moving location (step 270). Then, the RFID reader 120 calculates a moving speed by dividing a distance from the pre-moving location (i.e. the current location measured in step 240) to the post-moving location (i.e. the location measured in step 270) by the movement time measured in step 260, and calculating a moving direction by calculating a vector from the pre-moving location to the post-moving location (step 280).

Figure 3:
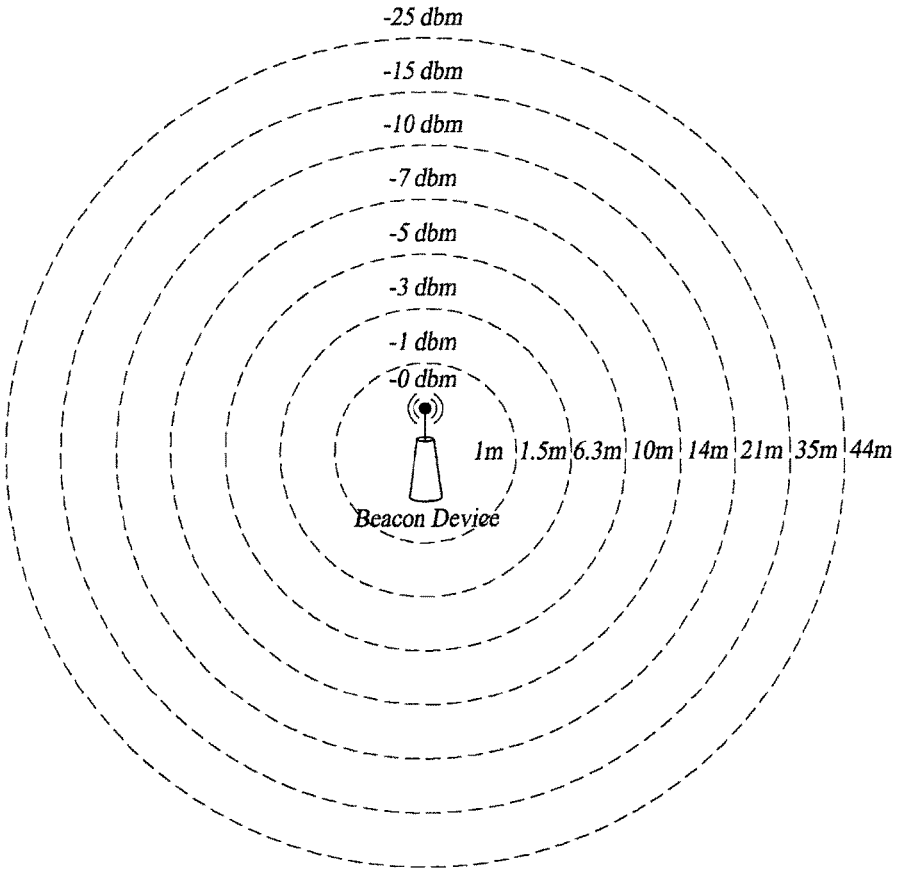
FIG. 3 is a view illustrating a situation where a beacon device emits a beacon according to an exemplary embodiment of the present invention.

FIG. 3 is a view illustrating a situation where a beacon device emits a beacon according to an exemplary embodiment of the present invention.

Each beacon device 110, 112, and 114 emits a beacon so that the RFID reader 120 can measure the location of the RFID reader 120, wherein the beacon is attenuated according to distance, so that the power of an emitted beacon decreases as the emitted beacon becomes more distant from each corresponding beacon device 110, 112, and 114.

In this case, the signal attenuation is influenced mostly by the propagation environment according to circumstances of each beacon device 110, 112, and 114. That is, when there is a factor causing large signal attenuation, such as a case where buildings and/or structures are distributed or a high power line passes around a specific beacon device, a signal attenuation rate is very high, so that an available emission distance is shortened. In contrast, when such an attenuation factor is small, a corresponding beacon device can emit a beacon for a longer distance.

Therefore, since each beacon device 110, 112, and 114 is fixedly installed, it is possible to create a database by measuring signal intensities of a beacon according to distance based on a propagation environment when each beacon device has been installed and the circumstances of the beacon has been determined.

That is, when a specific beacon device emits a beacon, as shown in FIG. 3, a database of signal-intensity-to-distance information can be created as Table 1 below.

TABLE 1

| Power (dbm) | Range (m) |
|---|---|
| 0 | 1 |
| −1 | 1.5 |
| −3 | 6.3 |
| −5 | 10.3 |
| −7 | 14 |
| −10 | 21 |
| −15 | 35 |
| −25 | 44 |

Therefore, the specific beacon device emits a beacon, including its own reference location information and the signal-intensity-to-distance information as shown in Table 1.

In a state where the specific beacon device emits a beacon, as shown in FIG. 3, when the RFID reader 120 receives the beacon from the specific beacon device and obtains −10 dBm as a result of measurement of the signal intensity of the beacon, the RFID reader 120 can identify a distance of 21 meters corresponding to −10 dBm by checking the signal-intensity-to-distance information included in the beacon, so that the RFID reader 120 can recognize that the RFID reader 120 is located at a distance of 21 meters from the specific beacon device. It goes without saying that a distance of 21 meters is a relative distance because it is not a two-dimensional distance, but a three-dimensional distance.

Here, when it is assumed that the specific beacon device corresponds to the first beacon device 110, the second beacon device 112 and the third beacon device 114 also can emit beacons, as shown in FIG. 3. However, since the second beacon device 112 and the third beacon device 114 may be under different propagation environment from the first beacon device 110, signal attenuation rates may be different, so that each piece of signal-intensity-to-distance information included in beacons by the second beacon device 112 and third beacon device 114 may be different from that shown in Table 1.

That is, since the first to third beacon devices 110, 112, and 114 are under different propagation environments, and thus attenuation rates of beacons emitted from the beacon devices 110 to 114 are different, distances to which beacons having the same signal intensity can reach may be different. Therefore, each of the first to third beacon devices 110, 112, and 114 makes a database of signal-intensity-to-distance information through measurements in advance, creates a table shown in Table, and emits the signal-intensity-to-distance information through a beacon so that the RFID reader 120 can exactly measure the current location.

Figure 4:
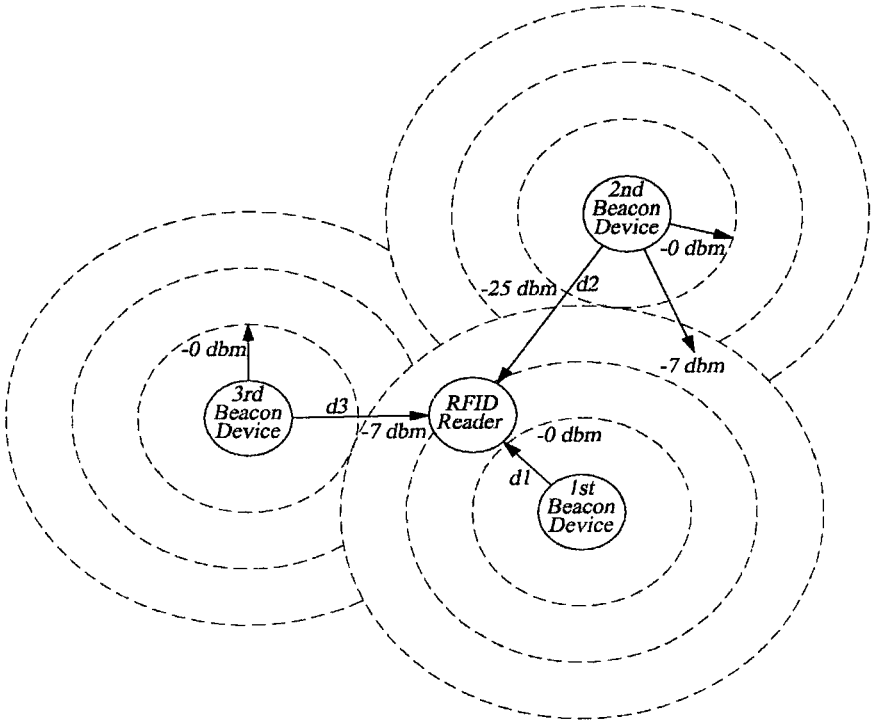
FIGS. 4A and 4B are views explaining an example of a procedure of measuring the current location by an RFID reader according to an exemplary embodiment of the present invention.
Figure 4:
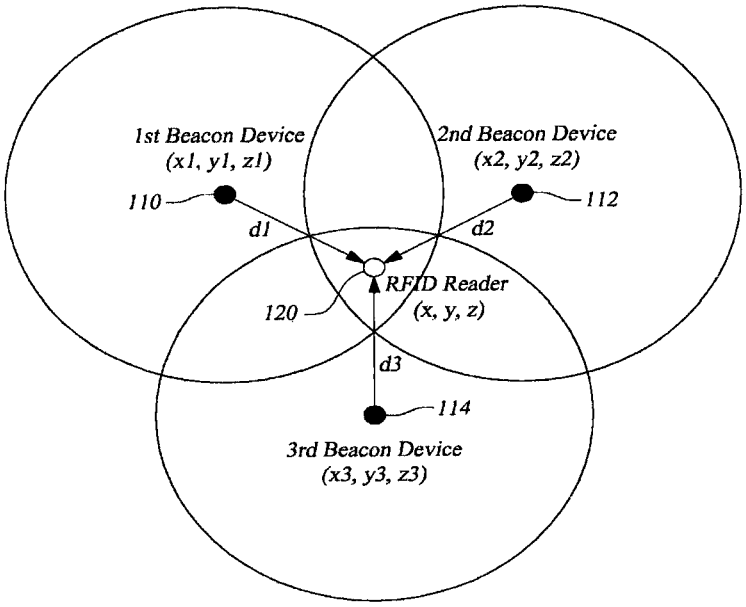

FIGS. 4A and 4B are views explaining an example of a procedure of measuring the current location by an RFID reader according to an exemplary embodiment of the present invention.

FIG. 4A is a view explaining an example of a procedure of identifying, by an RFID reader, relative distances from beacon devices according to an exemplary embodiment of the present invention.

In a state where the first to third beacon devices 110, 112, and 114 are fixedly installed, the RFID reader 120 is located within beacon emission ranges of the three beacon devices, as shown in FIG. 4A, and the RFID reader 120 receives a first beacon, a second beacon, and a third beacon from the beacon devices 110, 112, and 114.

The RFID reader 120 measures the signal intensities of the first to third beacons received from the beacon devices 110, 112, and 114, respectively. When it is assumed that the signal intensity of the first beacon is 0 dBm, the signal intensity of the second beacon is −25 dBm, and the signal intensity of the third beacon is −7 dBm, as shown in FIG. 4A, the RFID reader 120 can identify distance "d1" corresponding to 0 dBm by checking first signal-intensity-to-distance information included in the first beacon, can identify distance "d2" corresponding to −25 dBm by checking second signal-intensity-to-distance information included in the second beacon, and can identify distance "d3" corresponding to −75 dBm by checking third signal-intensity-to-distance information included in the third beacon.

FIG. 4B is a view explaining an example of a procedure where the RFID reader 120 calculates the current location by using the relative distances from the beacon devices and the reference location of each beacon device according to an exemplary embodiment of the present invention.

After identifying relative distances from the beacon devices 110, 112, and 114 by measuring the signal intensity of each beacon (i.e. each of the first to third beacons) received from each beacon device 110, 112, and 114, as described above with reference to FIG. 4A, the RFID reader 120 identifies first reference location information, second reference location information, and third reference location information included in the beacon, i.e. in the first beacon, the second beacon, and the third beacon, respectively.

Here, the first reference location information, the second reference location information, and the third reference location information correspond to three-dimensional coordinate information about the x-axis y-axis and z-axis coordinates of the beacon devices 110, 112, and 114, respectively.

Here, when it is assumed that the first reference location information corresponds to coordinates (x1, y1, z1), the second reference location information corresponds to coordinates (x2, y2, z2), and the third reference location information corresponds to coordinates (x3, y3, z3), as shown in FIG. 4B, the RFID reader 120 can calculate the current location through the triangulation method by means of the relative distances from the beacon devices 110, 112, and 114, identified as described above, and the three-dimensional coordinate information of each beacon device 110, 112, and 114.

That is, when the three-dimensional coordinates of the current location of the RFID reader 120 correspond to (x, y, z), an equation for the current location can be derived as equation 1 below by using the triangulation method.

$$(x1-x)^2+(y1-y)^2+(z1-z)^2=(d1-err)$$

$$(x2-x)^2+(y2-y)^2+(z2-z)^2=(d2-err)$$

$$(x3-x)^2+(y3-y)^2+(z3-z)^2=(d3-err) \qquad \text{[Math FIG. 1]}$$

In equation 1, "err" represents an error with respect to distance, and is a constant which can be determined according to a tolerable error rate in the current location.

Also, "x1," "y1," "z1," and "d1" correspond to the first reference location information and the relative distance from the first beacon device 110, and are constants which can be identified from the first beacon. "x2," "y2," "z2," and "d2" correspond to the second reference location information and the relative distance from the second beacon device 112, and are constants which can be identified from the second beacon. "x3," "y3," "z3," and "d3" correspond to the third reference location information and the relative distance from the third beacon device 114, and are constants which can be identified from the third beacon.

Therefore, since only "x," "y," and "z" correspond to variables to be found in three equations shown in equation 1, the three-dimensional coordinates (x, y, z) of the current location of the RFID reader 120 can be obtained by solving the three simultaneous equations.

As described above, according to the present invention, at least three beacon devices emitting beacons are fixedly installed in the RFID system, and each beacon device 110, 112, and 114 emits a beacon, including reference location information of the beacon device and signal-intensity-to-distance information where the propagation environment of the circumstances of the beacon device is reflected, which helps the RFID reader 120 to determine the current location. Then, the RFID reader 120 measures the signal intensities of a first beacon, a second beacon, and a third beacon, which have been received from the beacon devices 110, 112, and 114, respectively, identifies relative distances corresponding to the signal intensities of the beacons, respectively, and calculates the current location by using three-dimensional coordinates of each beacon device 110, 112, and 114, so that the moving RFID reader 120 can measure its own location, and furthermore, can exactly measure the location because the propagation environment of circumstances of each beacon device 110, 112, and 114 can be reflected.

Figure 5:
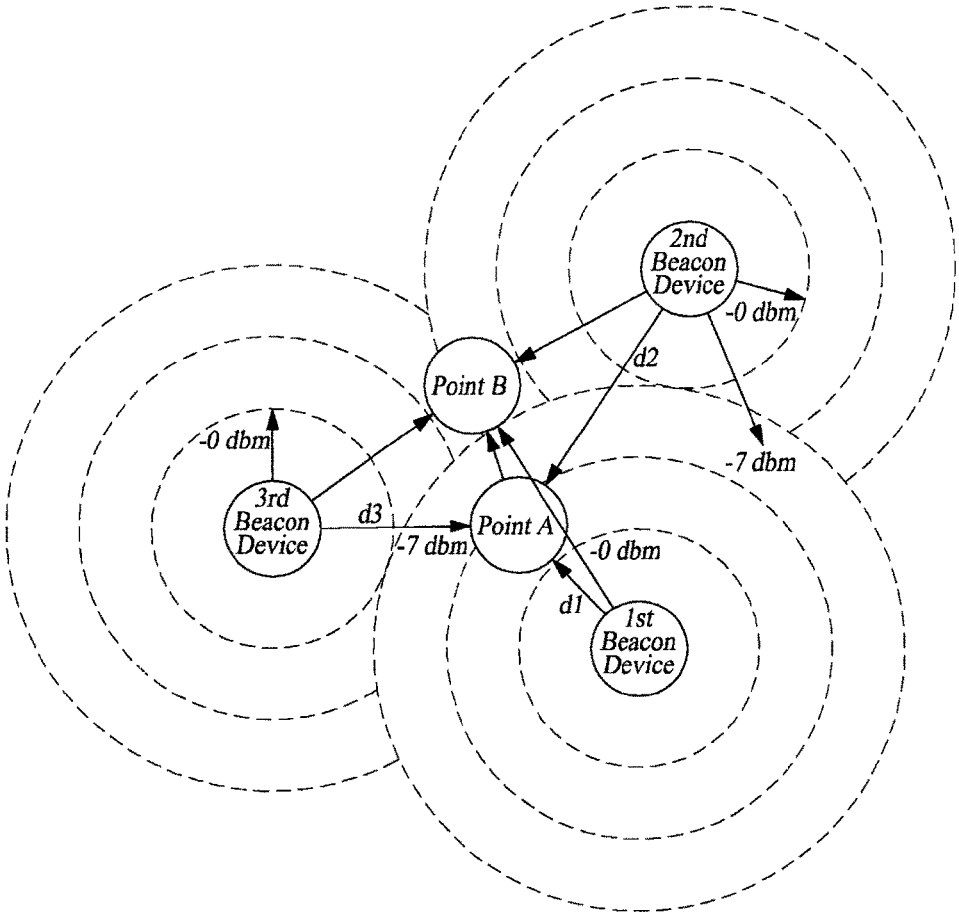
FIG. 5 is a view explaining an example of a procedure of measuring a moving speed and a moving direction by an RFID reader according to an exemplary embodiment of the present invention.

FIG. 5 is a view explaining an example of a procedure of measuring a moving speed and a moving direction by an RFID reader according to an exemplary embodiment of the present invention.

As described above with reference to FIGS. 4A and 4B, the RFID reader 120 according to an exemplary embodiment of the present invention can measure its own current location by using at least three beacon devices.

Meanwhile, the RFID reader 120 can freely move in the RFID system, and can continuously measure its own location, even while it is moving. Hereinafter, a procedure where the RFID reader 120 calculates or measures its moving speed and its moving direction while the RFID reader 120 is moving in the RFID system will be described.

When it is assumed that the RFID reader 120 has moved from point A to point B, point A corresponds to three-dimensional coordinates (x1, y1, z1), and point B corresponds to three-dimensional coordinates (x2, y2, z2), as shown in FIG. 5, a moving speed of the RFID reader 120 may be derived as equation 2.

$$\frac{\sqrt{(x2-x1)^2(y2-y1)^2+(z2-z1)^2}}{\text{movement time}} \quad \text{[Math Figure 2]}$$

That is, since a speed can be expressed as a ratio of a distance to a time, the RFID reader 120 can calculate a moving speed by dividing its own moving distance by its own moving time. This is to calculate a moving speed by dividing a distance from a pre-moving location to a post-moving location by a moving time.

Also, a moving direction of the RFID reader 120 may be derived as equation 3.

$$\vec{d}=(x2-x1,y2-y1,z2-z1) \quad \text{[Math FIG. 3]}$$

That is, a vector from x-axis, y-axis, and z-axis coordinates of a pre-moving location to x-axis, y-axis, and z-axis coordinates of a post-moving location corresponds to a moving direction.

Therefore, the RFID reader 120 can calculate its moving speed and its moving direction by equations 2 and 3, can use the calculated moving speed and moving direction to confirm if the RFID reader 120 is accurately moving toward a destination, and can utilize the calculated moving speed and moving direction to calculate and estimate a direction and a speed in which the RFID reader 120 is to move to the destination.

Although an exemplary embodiment of the present invention has been described for illustrative purposes, those skilled in the art will appreciate that various modifications, additions and substitutions are possible, without departing from the scope and spirit of the invention as disclosed in the accompanying claims. Therefore, the embodiment disclosed in the present invention has been described not for limiting the scope of the invention, but for describing the invention. Accordingly, the scope of the invention is not to be limited by the above embodiment but by the claims and the equivalents thereof. It will be understood by those skilled in the art that various changes in form and details may be made therein without departing from the spirit and scope of the invention as defined by the appended claims.

INDUSTRIAL APPLICABILITY

As described above, according to the present invention, it is possible to measure the location of a moving RFID reader in an RFID system.

Also, since the location of the RFID reader is measured in consideration of propagation environments, it is possible to increase the accuracy of the location measurement.

In addition, since the RFID reader can measure its own location while the RFID reader is moving, it is possible to measure the moving speed and moving direction of the RFID reader.

The invention claimed is:

1. A [radio frequency identification (RFID) system for measuring a location of an RFID reader by using a beacon] *short-range wireless communication system*, the *short-range wireless communication* system comprising:

a plurality of beacon [devices] *transmitters*, each of which is fixed at a reference location *and comprises an antenna, a processor* and [configured to create a database of] *a memory having computer executable instructions stored thereon that, when executed by the processor, cause each of the beacon transmitters to:*

*emit a beacon, wherein each of the beacon transmitters stores* information about signal intensities to distances [by measuring] *of the beacon, the information about the* signal intensities [of the beacon according] to [distance] *distances having been obtained* based on a propagation environment [and emit the beacon which] *around each of the beacon transmitters, wherein the beacon* includes information about the reference location of each [beacon device] *of the plurality of the beacon transmitters* and the information about *the* signal intensities to distances [from each beacon device]; and

[an RFID reader configured to receive the beacon] *a means for*

*receiving beacons* from [each of] the plurality of beacon [devices] *transmitters*,

[measure a signal intensity of each received beacon, determine a distance from each beacon device by analyzing the measured signal intensity on the basis of the] *extracting* information about signal intensities to distances [included in the received beacon and to calculate a current location thereof by using both] *from the received beacons,*

*measuring signal intensities of the received beacons,*

*determining distances from the respective beacon transmitters based on the measured signal intensities and* the information about the *signal intensities to distances, and*

*calculating the location of the means based on* reference [location] *locations of the plurality of beacon transmitters* and the determined [distance] *distances* from [each beacon device] *the plurality of beacon transmitters*, wherein the [RFID reader calculates] *means is configured to calculate* the [current] location *of the means* through a triangulation method [using] *based on* the reference [location] *locations* of [each beacon device] *the plurality of beacon transmitters* and the determined [distance] *distances* from [each beacon device] *the beacon transmitters*.

2. The system as claimed in claim 1, wherein the [RFID reader receives the plurality of beacons from at least] *beacon transmitters include* three [beacon devices among the plurality of beacon devices] *or more beacon transmitters*.

3. The system as claimed in claim 2, wherein, when receiving the [plurality of] beacons from [said at least] *more than* three beacon [devices] *transmitters*, the [RFID reader] *means* calculates the [current] location [by] *of the means* using three beacons having relatively higher signal intensities among the [plurality of] *received* beacons.

4. The system as claimed in claim 1, wherein the [RFID reader calculates] *means is configured to store the location of the means at a first moment as* a [pre-moving] *first location and the* location [and a post-moving] *thereof at a second moment as a second* location, [and calculates] *the first moment being different from the second moment, and calculate* a speed and a *moving* direction *of the means* from the [pre-moving] *first* location to the [post-moving] *second* location, *based on a distance from the first location to the second location and a time difference between the first moment and the second moment*.

5. The system as claimed in claim 4, wherein the [RFID reader measures a movement time from the pre-moving location to the post-moving location, calculates a distance from the pre-moving location to the post-moving location, and then calculates a ratio of the distance to the time as the speed] *means is configured to calculate the moving direction by calculating a vector from the first location to the second location*.

6. The system as claimed in claim [4, wherein the RFID reader calculates the direction by calculating a vector from the pre-moving location to the post-moving location] *1, wherein the short-range wireless communication system is a radio frequency identification (RFID) system, and the beacon transmitters are beacon devices*.

7. A method for calculating [a current location of a radio frequency identification (RFID) reader in an RFID system by using a beacon of a beacon device in a plurality of beacon devices each of which is fixed at a reference location and configured to create a database of information about signal intensities to distances by measuring signal intensities of the beacon according to distance based on a propagation environment and emit the beacon which includes information about the reference location of each beacon device and the information about signal intensities to distances from each beacon device] *the location of the means using the system of claim 1*, the method comprising [the steps of:

(a)] receiving [a plurality of] beacons from the plurality of beacon [devices] *transmitters fixed at the reference locations respectively*;

*extracting the information about the signal intensities to distances from the received beacons;*

[(b)] measuring signal intensities of the [plurality of beacons; and (c)] *received beacons;* determining distances from the [plurality of beacon devices by analyzing the measured signal intensities on the basis of the information about signal intensities to distances included in the plurality of received beacons] *respective beacon transmitters based on the measured signal intensities and the information about the signal intensities to distances*; and

[(d)] calculating the location of [each beacon device by using the reference locations of the plurality of beacon devices and the determined distances in step (c) from the plurality of beacon devices] *the means through a triangulation method based on the reference locations of the beacon transmitters and the determined distances from the beacon transmitters*.

8. The method as claimed in claim 7, [where step (c) comprising the steps of:

(c1) identifying information about the reference locations of the plurality of beacon devices, which is included in the plurality of beacons, by analyzing the plurality of beacons; and (c2) calculating the location through a triangulation method using the reference locations of the plurality of beacon devices and the determined distances from the plurality of beacon devices] *further comprising:*

*storing the location of the means at a first moment as a first location;*

*storing the location thereof at a second moment as a second location, the first moment being different from the second moment; and*

*calculating a speed and a moving direction of the means from the first location to the second location, based on a distance from the first location to the second location and a time difference between the first moment and the second moment*.

9. The method as claimed in claim 7, [further comprising, after step (c), the steps of:

(d) moving the current location to a next location; and (e) calculating a moving speed and a moving detection from the current location to the next location] *wherein the plurality of beacon transmitters are beacon devices*.

10. A method for calculating [a current] *the* location of [a radio frequency identification (RFID) reader] *the means of claim 1*, the method comprising [the steps of]:

receiving [a beacon at the RFID reader] *beacons* from [each of at least three beacon devices] *a plurality of beacon transmitters which are* disposed near the [RFID reader, each beacon including first] *means, wherein the beacons include* information about [a] reference [location] *locations* of [each beacon device and second] *the beacon transmitters and* information about signal intensities to distances [from each beacon device], *respectively*;

[retrieving at the RFID reader the first information and the second information from each received beacon] *extracting information about the signal intensities to distances from the received beacons*;

measuring [at the RFID reader a signal intensity of each received beacon] *signal intensities of the received beacons*;

determining [at the RFID reader a distance from each beacon device by analyzing the measured signal intensity on the basis of the retrieved second information] *distances from the respective beacon transmitters based on the measured signal intensities and the information about the signal intensities to distances*; and calculating [at the RFID reader] the [current] location [by using both the retrieved first information about the reference location and the determined distance, wherein the each beacon device has a database of information about signal intensities to distances by measuring signal intensities of the beacon according to distance based on a propagation environment] *of the means through a triangulation method based on the reference locations of the beacon transmitters and the determined distances from the beacon transmitters*.

*11. The method as claimed in claim 10, wherein the beacon transmitters are beacon devices.*

*12. The method as claimed in claim 10, wherein the beacon includes at least one of an RF signal, a Zigbee signal and a Bluetooth signal.*

*13. The method as claimed in claim 1, wherein the beacon includes at least one of an RF signal, a Zigbee signal and a Bluetooth signal.*

*14. The system as claimed in claim 7, wherein the beacon includes at least one of an RF signal, a Zigbee signal and a Bluetooth signal.*

* * * * *